(12) United States Patent
Berger et al.

(10) Patent No.: US 11,767,177 B2
(45) Date of Patent: Sep. 26, 2023

(54) TRANSFER OF PRODUCTS BETWEEN A TRANSIT ZONE AND A COLLECTING SURFACE

(71) Applicant: SIDEL PARTICIPATIONS, Octeville-sur-Mer (FR)

(72) Inventors: Julien Berger, Reichstett (FR); Anthony Gehin, Reichstett (FR); Zmaj Petrovic, Reichstett (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 436 days.

(21) Appl. No.: 16/958,163

(22) PCT Filed: Dec. 20, 2018

(86) PCT No.: PCT/FR2018/053472
§ 371 (c)(1),
(2) Date: Jun. 26, 2020

(87) PCT Pub. No.: WO2019/129966
PCT Pub. Date: Jul. 4, 2019

(65) Prior Publication Data
US 2021/0061582 A1    Mar. 4, 2021

(30) Foreign Application Priority Data

Dec. 27, 2017    (FR) .................................... 1763241

(51) Int. Cl.
*B65G 47/69* (2006.01)
*B65G 47/71* (2006.01)
*B65G 47/82* (2006.01)

(52) U.S. Cl.
CPC ............. *B65G 47/71* (2013.01); *B65G 47/82* (2013.01)

(58) Field of Classification Search
None
See application file for complete search history.

(56) References Cited

U.S. PATENT DOCUMENTS 2,217,982 A  *  10/1940  Heil ...................... B65G 47/82
                                                      156/DIG. 25
3,040,867 A  *   6/1962  Posten .................. B65G 47/82
                                                            198/430

(Continued)

FOREIGN PATENT DOCUMENTS

CN      113165813 B   *  3/2023   ......... A22C 17/0006
DE      20220048 U1      5/2004

(Continued)

OTHER PUBLICATIONS

Gebo Cermex, "AQFLEX," Youtube, Nov. 6, 2017, p. 3, https://www.youtube.com/watch?v=r7axukhUems [retrieved on Sep. 13, 2018].

(Continued)

*Primary Examiner* — Joseph A Dillon, Jr.

(57) ABSTRACT

The invention relates to a transfer device for transferring products in an industrial processing line for the in-line processing of products, between a collecting surface and a transit zone running alongside the collecting surface, said transit zone comprising at least two longitudinal conveyors spaced away from a slider bed and each intended to transport a file of products, said device comprising said collecting surface, said transit zone, and a transfer tool transferring between the collecting surface and the transit zone, equipped with at least three longitudinal vertical walls, and intended to push, transversely, longitudinal rows of products which rows are each positioned between two walls. This device is wherein at least one wall of the transfer tool is mounted with the ability to move translationally on said tool in a transverse (Continued)

direction, for a movement of pushing said products. Other subjects of the invention are corresponding methods.

17 Claims, 8 Drawing Sheets

(56) References Cited

U.S. PATENT DOCUMENTS

| | | | | |
|---|---|---|---|---|
| 3,090,502 | A * | 5/1963 | Gunzelmann | B66C 1/442 414/931 |
| 3,311,217 | A * | 3/1967 | Muhlenbruch | B65B 21/06 198/429 |
| 3,543,949 | A * | 12/1970 | Weier | B65G 59/005 221/10 |
| 4,610,347 | A * | 9/1986 | Inoko | B65G 47/086 198/418.7 |
| 5,069,594 | A * | 12/1991 | Bott | B65B 69/0033 53/381.1 |
| 5,127,209 | A * | 7/1992 | Hunter | B65H 33/16 53/529 |
| 5,353,915 | A * | 10/1994 | Schneider | B65G 47/681 198/453 |
| 5,893,449 | A * | 4/1999 | Leidy | C03B 35/06 198/740 |
| 5,950,799 | A * | 9/1999 | Peltier | C03B 35/10 198/430 |
| 6,202,827 | B1 * | 3/2001 | Drewitz | B65G 47/082 198/433 |
| 6,296,103 | B1 * | 10/2001 | Gross | B26D 7/0675 198/429 |
| 6,328,153 | B1 * | 12/2001 | Manghi | B65G 47/088 198/747 |
| 7,784,599 | B2 * | 8/2010 | Balleza | A21C 9/085 198/429 |
| 8,668,072 | B2 * | 3/2014 | Gatos | B65G 47/088 198/429 |
| 8,739,960 | B2 * | 6/2014 | Eschlbeck | B65G 47/22 198/429 |
| 8,863,937 | B2 * | 10/2014 | Buchenberg | B65G 47/71 198/341.02 |
| 9,039,345 | B2 * | 5/2015 | Parker | B65G 47/8815 414/729 |
| 9,162,817 | B2 * | 10/2015 | Winkler | B65G 1/1378 |
| 9,505,562 | B2 * | 11/2016 | Petrovic | B65G 37/00 |
| 9,637,256 | B2 * | 5/2017 | Van Wickeren | B65B 27/04 |
| 9,725,247 | B2 * | 8/2017 | Trebbi | B65G 25/08 |
| 9,764,907 | B2 * | 9/2017 | Bonnier | B65G 47/90 |
| 9,878,855 | B2 * | 1/2018 | Gehin | B65G 47/69 |
| 10,144,596 | B2 * | 12/2018 | Yohe | B65G 47/74 |
| 10,442,635 | B2 * | 10/2019 | Gehin | B65G 47/845 |
| 10,850,931 | B2 * | 12/2020 | Gehin | B65G 47/82 |
| 10,906,751 | B2 * | 2/2021 | Berger | B65G 47/5109 |
| 10,926,961 | B2 * | 2/2021 | Berger | B65G 47/265 |
| 11,155,422 | B2 * | 10/2021 | Berger | B65G 47/5109 |
| 11,268,759 | B2 * | 3/2022 | Tanaka | B65G 21/2072 |
| 11,377,306 | B2 * | 7/2022 | Senn | B65G 47/715 |
| 11,643,282 | B2 * | 5/2023 | Demel | B65G 47/5113 198/347.1 |
| 2002/0070097 | A1 * | 6/2002 | Ritter | B65G 15/14 198/728 |
| 2010/0281823 | A1 * | 11/2010 | Stahl | B65G 47/082 53/154 |
| 2011/0220460 | A1 * | 9/2011 | Seger | B65G 47/71 198/442 |
| 2012/0325622 | A1 * | 12/2012 | Gatos | B65G 47/82 198/373 |
| 2016/0362258 | A1 * | 12/2016 | Anders | B65G 47/82 |
| 2017/0001810 | A1 * | 1/2017 | Gehin | B65G 47/5131 |
| 2018/0305138 | A1 * | 10/2018 | Wittmann | B65G 47/261 |
| 2019/0233221 | A1 * | 8/2019 | Gehin | B65G 47/82 |
| 2019/0367199 | A1 * | 12/2019 | Gehin | B65B 35/36 |
| 2021/0206583 | A1 * | 7/2021 | Gehin | B65G 47/088 |

FOREIGN PATENT DOCUMENTS

| | | | | |
|---|---|---|---|---|
| EP | 3112298 | A1 * | 1/2017 | B65G 37/00 |
| FR | 3038307 | A1 | 1/2017 | |
| FR | 3088315 | A1 * | 5/2020 | B65G 47/681 |
| JP | H0341716 | U | 4/1991 | |
| WO | 9711898 | A1 | 4/1997 | |
| WO | WO-2023046311 | A1 * | 3/2023 | |

OTHER PUBLICATIONS

Gebo Cermex, "AQFlex XS: advanced performance and unique agility in a compact design," Youtube, May 5, 2017, p. 5, https://www.youtube.com/watch?v=prxl8DnJjTw [retrieved on Sep. 13, 2018].

International Search Report for International Application No. PCT/FR2018/053472, dated Apr. 16, 2019.

English translation of sections of JPH0341716 cited in JP Office Action dated Jan. 31, 2023.

* cited by examiner

TRANSFER OF PRODUCTS BETWEEN A TRANSIT ZONE AND A COLLECTING SURFACE

CROSS-REFERENCE TO RELATED APPLICATIONS

This application is the 35 U.S.C. § 371 national stage of PCT application having serial number PCT/FR2018/053472, filed on Dec. 20, 2018. This application also claims priority to French application serial number FR1763241 filed on Dec. 27, 2017, each of which are entirely incorporated herein by reference.

DETAILED DESCRIPTION OF THE INVENTION

The present invention falls within the field of the conveying of products within an industrial processing line, and the subjects of the invention are, on the one hand, a device for transferring to and from a collecting surface and, on the other hand, two methods implementing this transfer device, namely a method of supplying and a method of clearing a collecting surface.

In this domain, products, which may be bottles, cans, vials, tins, cases, boxes, parcels or the like are conveyed between successive processing stations using conveyors essentially of the endless-band type. The products are processed or even conveyed in a single-file line, a multi-file line, and also even conveyed in bulk.

In order to have a complete line capable of producing continuously, despite the stoppages of the various workstations, for various reasons such as faults or lack of consumables, it is necessary to have collecting solutions between the workstations, which collect the products processed by the workstation upstream while the workstation downstream is unable to operate, and/or which provide the workstation downstream with products to be processed when the workstation upstream is unable to operate. It is also necessary to prepare the products for the workstation downstream, for example by organizing the stream into a multi-file line, etc.

Numerous collecting solutions are known, in which the products can enter and exit as a single-file line or as a multi-file line. The present invention is more particularly concerned with collecting solutions in which the products enter and/or exit in single file.

In this regard, document WO2014076390 discloses a collecting device with a single-file conveyor at its entry, a transverse collecting surface on a horizontal surface, followed by a single-file exit conveyor. In order to supply and empty this device, the products are transferred by respectively pushing the products from the entry conveyor toward the collecting surface and pushing the products from the collecting surface toward the exit conveyor. These transfers entail stopping the conveyor concerned so as to reduce the risks of products falling. In order to be able to supply and empty the collecting surface with a continuous stream of products, that document uses, upstream and downstream of the entry and exit conveyors, dedicated means notably for accelerating or slowing the products so as to create or reabsorb gaps.

However, at high throughput, this principle of transition between a continuous stream and a discontinuous stream is problematical because it generates accelerations, jolts and decelerations on the products which may be fragile, such as, typically, empty glass bottles.

In order to overcome these disadvantages, applications FR1556106 and FR165959569 describe transfer devices comprising a transit zone positioned along the collecting surface respectively between the single-file entry conveyor and the collecting surface (entry transit zone) and between the collecting surface and the single-file exit conveyor (exit transit zone). This transit zone is formed of two longitudinal conveyors, operating in alternation, and spaced away from a slider bed. The presence of such a zone makes it possible respectively, according to whether it is an entry transit zone or an exit transit zone, to supply or clear the collecting surface without the faults mentioned hereinabove.

Figure 1:
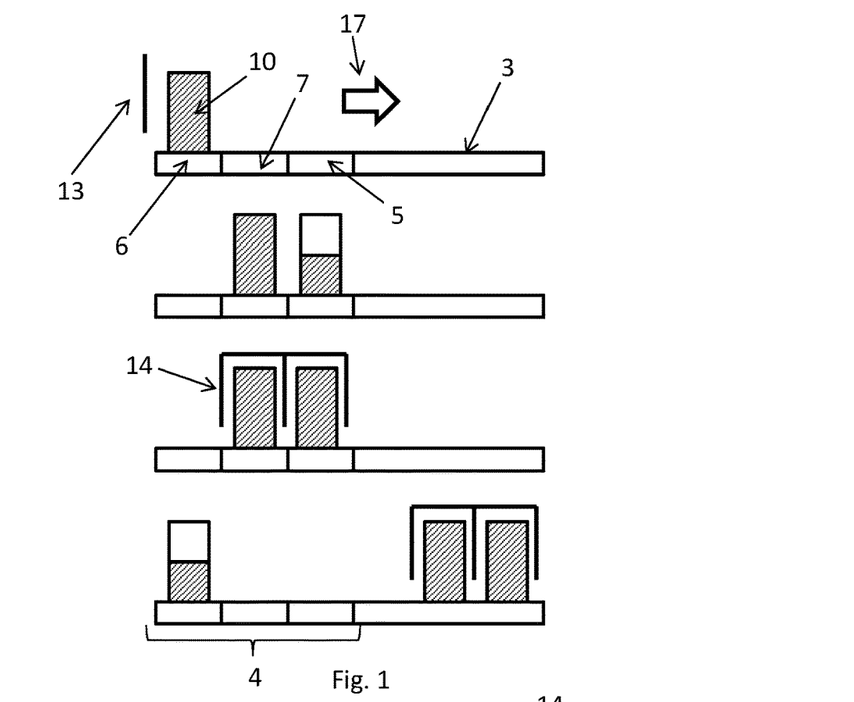
FIG. 1 is a schematic illustration of the transfer of the products from the entry transit zone to the collecting zone, in accordance with embodiments of the present disclosure.

The transfer of the products from the entry transit zone to the collecting zone is notably achieved as follows, and as illustrated in FIG. 1: the continuous single-file stream from the entry conveyor is directed alternately toward the longitudinal conveyor 6 of the transit zone 4 furthest away from the collecting surface 3 and toward the longitudinal conveyor 5 of the transit zone 4 that abuts the collecting zone 3, using a diverter. The two conveyors 5;6 of the transit zone 4 therefore operate alternately in order to accept or not accept products from the entry conveyor. When one conveyor 5;6 of the transit zone 4 is stopped, the products on it are pushed toward the collecting surface 3 while the other conveyor 5;6 accepts products coming from the entry conveyor. More specifically, when the conveyor 6 of the transit zone 4 that is furthest away from the collecting surface 3 is stopped, the row 10 of products on it is then pushed onto the slider bed 7 using a longitudinal vertical push plate 13 initially positioned to the side of the transit zone 4 that is the opposite side to the collecting surface 3. When the conveyor 5 abutting the collecting zone 3 is stopped, the two rows 10 that are on the slider bed 7 and on this conveyor 5 are transferred simultaneously by transverse pushing, using a double-cap tool 14 that comes in from above, on the collecting surface 3.

Figure 2:
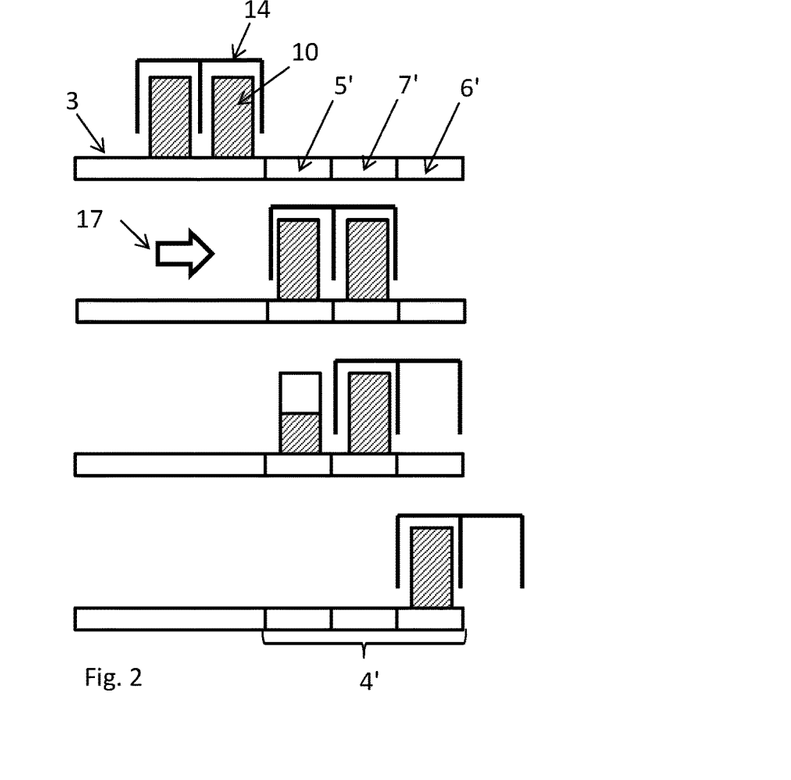
FIG. 2 is a schematic illustration of the transfer of the products from the collecting surface to the exit transit zone, in accordance with embodiments of the present disclosure.

The transfer of the products from the collecting surface to the exit transit zone is notably performed as follows, and as illustrated in FIG. 2: the exit conveyor positioned downstream of the transit zone 4' constantly receives products coming alternately from one or other of the conveyors 5';6' of the transit zone 4'. To do this, when the conveyor 5' of the transit zone 4' closest to the collecting surface 3 is stopped, two longitudinal rows 10 of products which are on the collecting surface 3 are transferred simultaneously by transverse pushing, using a double-cap tool 14 that comes in from above, respectively onto this stopped conveyor 5' and onto the slider bed 7'. While this is happening, the exit conveyor receives products coming from the other conveyor 6' of the transit zone. When the longitudinal conveyor 6' of the transit zone 4' furthest from the collecting surface 3 is stopped, the products that are on the slider bed 7' are transferred by transverse pushing onto this conveyor 7' using the double-cap tool 14, while the other conveyor 5' of the transit zone 4' releases its products onto the exit conveyor.

As depicted in FIGS. 1 and 2, and as is clear from the foregoing, the transfer devices described in these documents take up a great deal of floor space because the pushing tools employed extend outside of the transit zone on the opposite side to the collecting surface. Furthermore, in the case of the entry transfer device, two distinct tools are needed for transferring products from the transit zone onto the collecting surface, and this is particularly wasteful.

Thus, there is still a need in the current state of the art for a collecting solution that can be supplied and/or emptied continuously, while at the same time reducing its footprint and/or the associated cost.

In order to achieve this, the invention essentially proposes performing the operation of transfer between the transit zone and the collecting surface using a single tool comprising at least three longitudinal vertical walls, in which at least one of the walls is mounted with the ability to move transversely within said tool.

Thus, the movement of this wall within the tool may at least contribute to an action of pushing the products so as to limit the movement of the tool and therefore avoid it extending beyond the transit zone while at the same time, throughout the transfer, allowing the two conveyors of the transit zone to operate alternately.

One subject of the invention is thus a transfer device for transferring products in an industrial processing line for the in-line processing of products, between a collecting surface and a transit zone running alongside the collecting surface, said transit zone comprising at least two longitudinal conveyors spaced away from a slider bed and each intended to transport a file of products, said device comprising:

said collecting surface,
said transit zone, and
a transfer tool transferring between the collecting surface and the transit zone, equipped with at least three longitudinal vertical walls, and intended to push, transversely, longitudinal rows of products which rows are each positioned between two walls.

This device is characterized in that at least one wall of the transfer tool is mounted with the ability to move translationally on said tool in a transverse direction, for a movement of pushing said products. Thus, the transverse movement of at least one wall inside the tool provides a pushing movement so as to perform at least part of the transfer of the products.

Another subject of the invention is a method implemented by this device, namely a method for supplying products to a collecting surface installed between two workstations of an industrial processing line for the in-line processing of products, from an entry transit zone supplied with products continuously by an entry conveyor, said transit zone comprising at least one inner longitudinal conveyor and one outer longitudinal conveyor which are spaced away from a slider bed and each intended to transport a file of products, the transit zone running alongside the collecting surface in the region of the inner longitudinal conveyor, comprising at least the cyclic repetition of the following succession of steps:

a) feeding the outer conveyor with products,
b) stopping the products on the outer conveyor, halting the feeding of the outer conveyor with products and feeding the inner conveyor with products,
c) transversely pushing the products from the outer conveyor onto the slider bed,
d) stopping the products on the inner conveyor, halting the feeding of the inner conveyor with products and feeding the outer conveyor with products, and
e) transversely pushing the products from the inner conveyor and from the slider bed onto the collecting surface.

This method is characterized in that steps c) and e) are formed using the one same transfer tool comprising at least three longitudinal vertical walls, and in that step c) is performed at least using a movement of at least one wall of the transfer tool within said tool.

As a result, it is the transverse movement of one wall inside and with respect to the tool that at least partially performs the transfer of the products.

Yet another subject of the invention is another method implemented by this device, namely a method for removing products arranged in longitudinal rows side by side on a collecting surface installed between two workstations of an industrial processing line for in-line processing of products, to an exit transit zone so as to remove products continuously onto an exit conveyor, said transit zone comprising at least one inner longitudinal conveyor and an outer longitudinal conveyor which are spaced away from a slider bed and each intended to transport one file of products, the transit zone running alongside the collecting surface in the region of the inner longitudinal conveyor, comprising at least the cyclic repetition of the following succession of steps:

a) pushing the rows of products transversely from the collecting surface onto the inner conveyor and the slider bed;
b) actuating the inner conveyor to release the products thereon onto the exit conveyor;
c) pushing the products transversely from the slider bed onto the outer conveyor;
d) actuating the outer conveyor to release the products onto the exit conveyor and stopping the inner conveyor;

steps a) and c) being performed using the one same transfer tool comprising at least three longitudinal vertical walls.

This method is characterized in that step c) is performed at least using a movement of at least one wall 9 of the transfer tool 8 within said tool 8.

Figure 7:
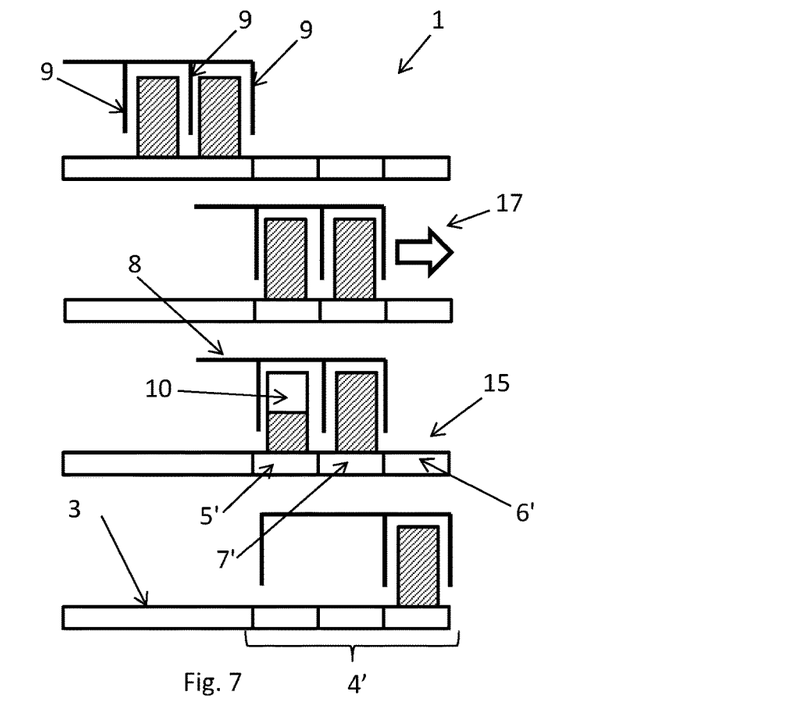
FIG. 7 is a schematic illustration of the transfer of products from a transit zone to a collecting surface, in accordance with embodiments of the present disclosure.
Figure 8:
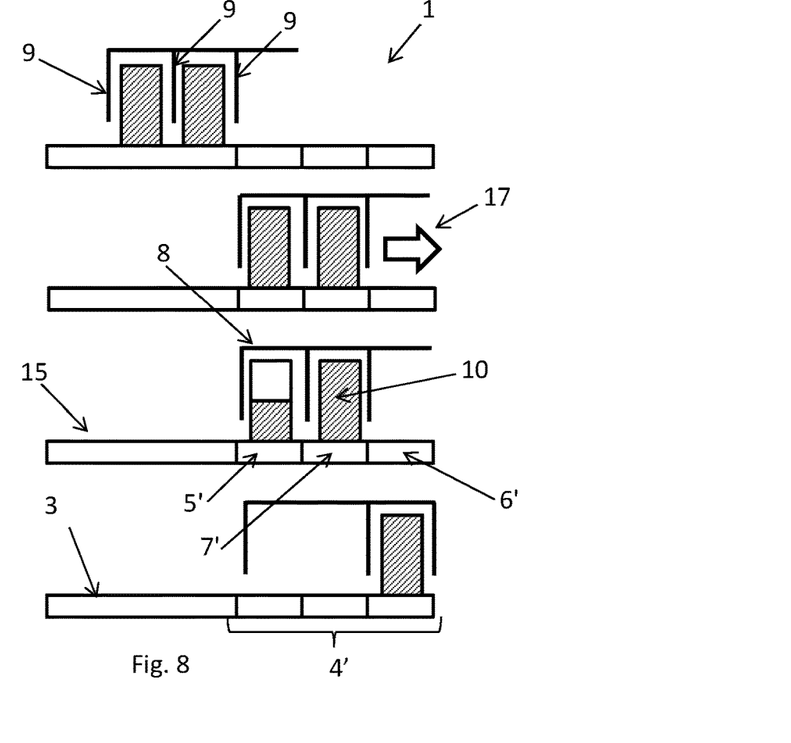
FIG. 8 is a schematic illustration of the transfer of products from a transit zone to a collecting surface, in accordance with embodiments of the present disclosure.
Figure 9:
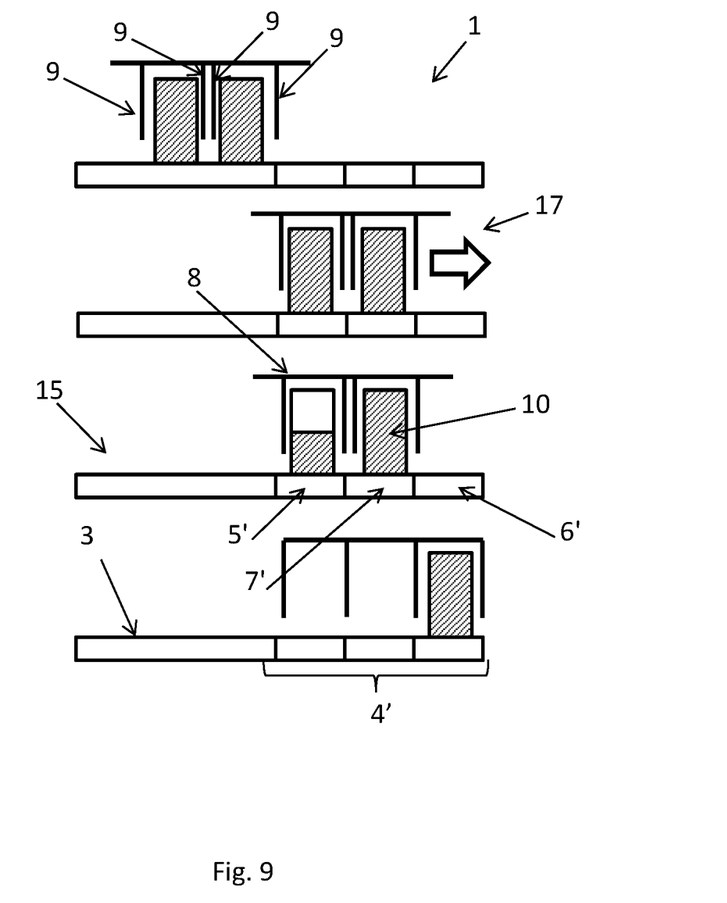
FIG. 9 is a schematic illustration of the transfer of products from a transit zone to a collecting surface, in accordance with embodiments of the present disclosure.
Figure 11:
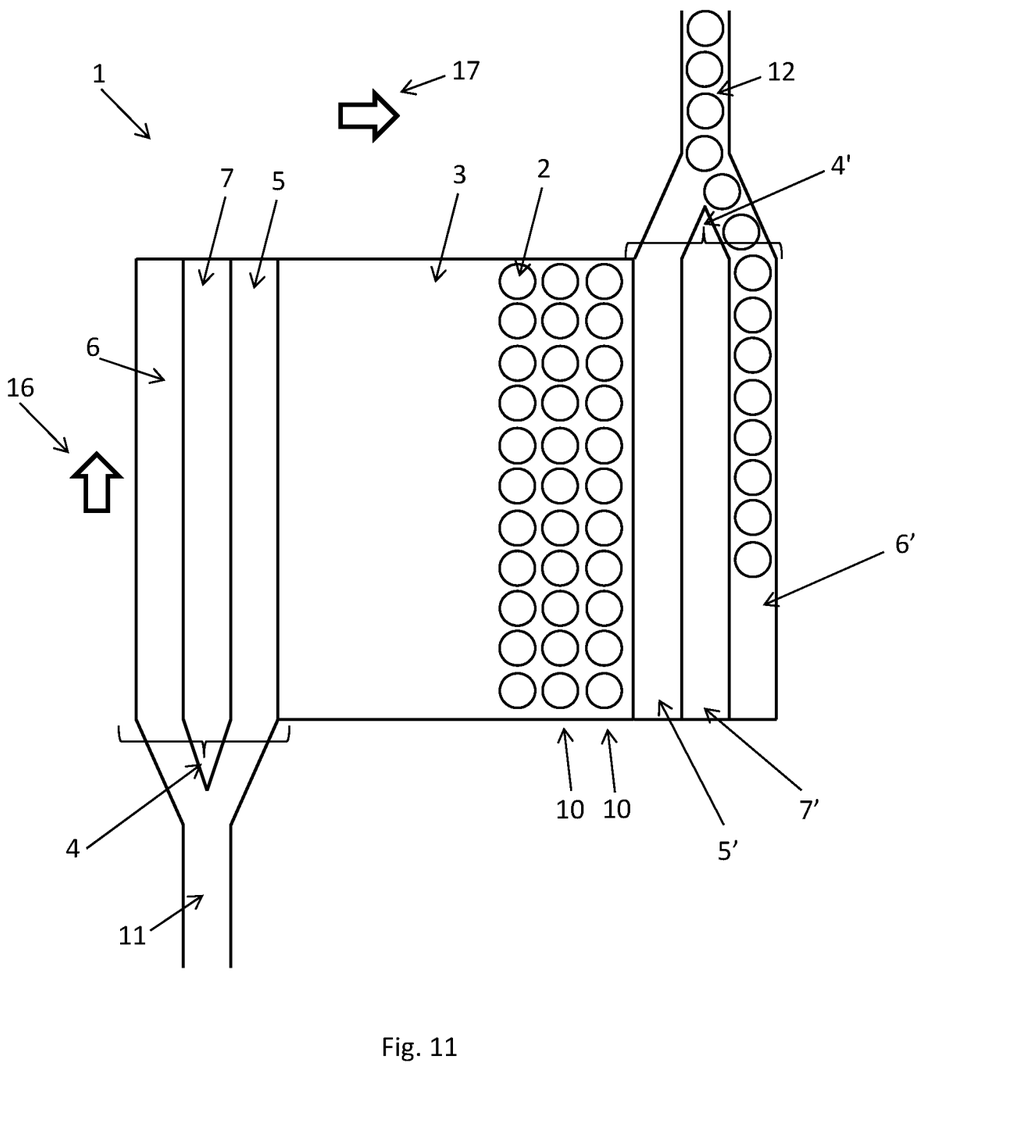
FIG. 11 is a schematic illustration of, in part and in view from above, a transfer device equipped with a collecting surface and with two transit zones, in accordance with embodiments of the present disclosure.
Figures 12, 13:
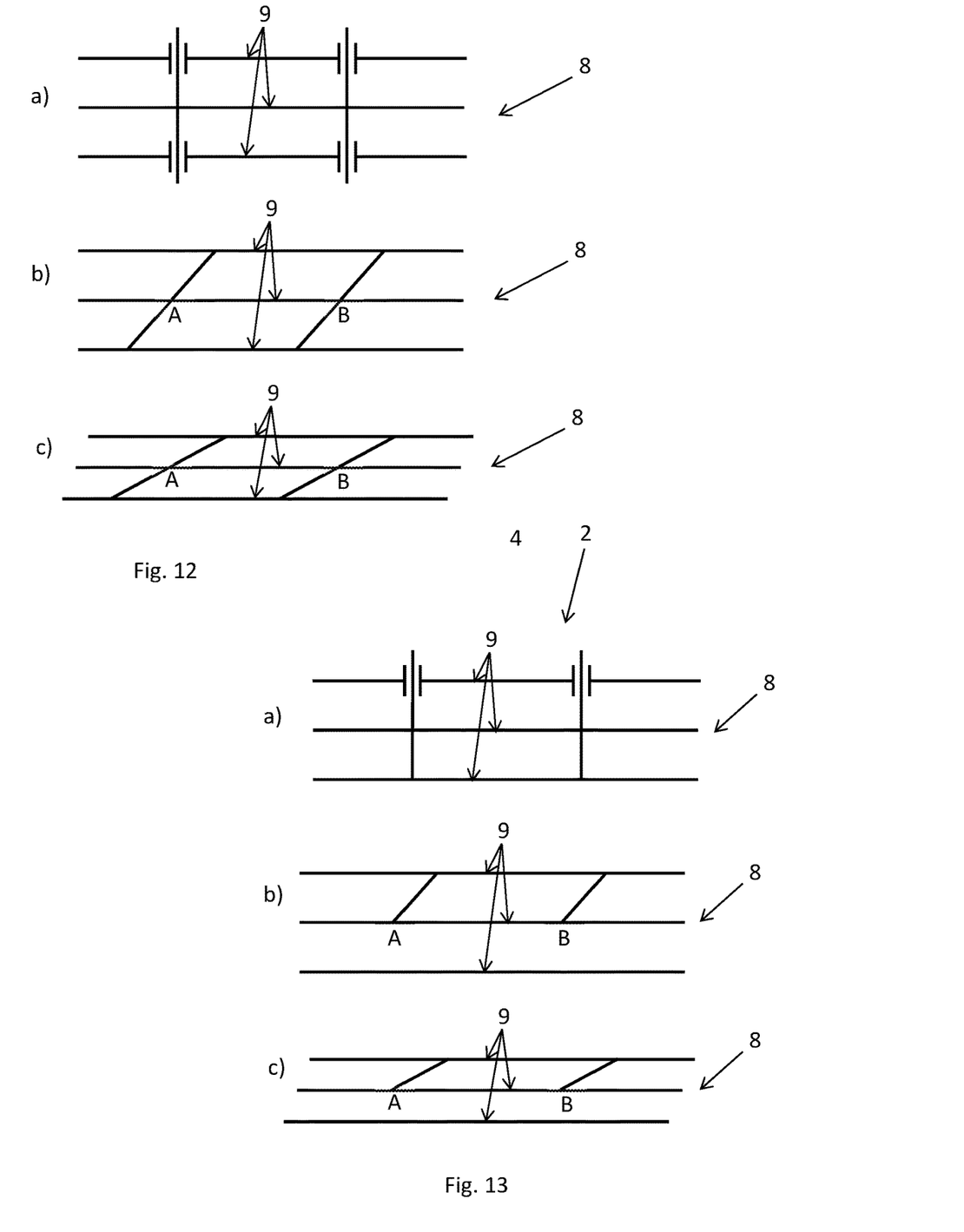
FIG. 12 is a schematic illustration of, in a view from above, a tool equipped with three longitudinal walls in which the two external walls are able to move, in accordance with embodiments of the present disclosure.
FIG. 13 is a schematic illustration of, in a view from above, a tool equipped with three longitudinal walls in an external wall is able to move, in accordance with embodiments of the present disclosure.

The invention will be better understood from the description below, which is based on possible embodiments explained illustratively and entirely nonlimitingly with reference to the attached figures in which:

FIGS. 1 and 2 respectively schematically depict the transfer of products from a transit zone to a collecting surface and from a collecting surface to a transit zone, these being as already described in the prior art;

FIGS. 3 to 6 and 10 schematically depict the transfer of products from a transit zone to a collecting surface according to various embodiments of the invention;

FIGS. 7 to 9 schematically depict the transfer of products from a collecting surface to a transit zone according to various embodiments of the invention;

FIG. 11 schematically depicts in part and in view from above, a transfer device equipped with a collecting surface and with two transit zones;

FIG. 12 schematically depicts in a view from above a tool equipped with three longitudinal walls of which the two external walls are able to move (FIG. 13 *a*)) with an example of a pantograph-type system that can be employed to manage this mobility (FIGS. 13 *b*) and *c*)); and FIG. 13 schematically depicts, in a view from above, a tool equipped with three longitudinal walls of which an external wall is able to move (FIG. 12 *a*)) with an example of a pantograph-type system that can be employed to manage this mobility (FIGS. 12 *b*) and *c*)).

Therefore a very first subject of the invention is a transfer device 1 for transferring products 2 in an industrial processing line for the in-line processing of products 2, between a collecting surface 3 and a transit zone 4;4' running alongside the collecting surface 3, said transit zone 4;4' comprising at least two longitudinal conveyors 5;5';6;6' spaced away from a slider bed 7;7' and each intended to transport a file of products 2.

The collecting surface 3 and, more generally, the transfer device 1, is installed between two successive workstations in an industrial plant. Such an industrial plant is a line for the in-line production and/or processing of products 2, and therefore a line that is in continuous operation. Such a plant comprises a succession of workstations each devoted to performing one specific task.

The products 2 are generally objects of the bottle, vial, tin or other container type, individually or collected into bundles, in cases or boxes.

These objects may stand upright within the device 1, namely with their longest dimension extending vertically or near-vertically.

The device 1 is thus situated between an upstream machine and a downstream machine. Such machines may, for example, be a labeling machine and a bundling machine or a filler and a case packer or alternatively still, a case packer and a palletizer.

Within the meaning of the present invention, what is meant by a "collecting surface 3" is a buffer surface receiving products circulating between two machines that process them, for example in single file or multiple files. Such a collecting surface 4 allows for the stoppage of the downstream machine not to lead to the stoppage of the upstream machine and vice versa. This surface also makes it possible to manage potential differences in throughput between said two machines.

The transfer device 1 moves the products 2, particularly rows of products 2, between a collecting surface 3 and a transit zone 4;4', namely equally well from a transit zone 4;4' to a collecting surface 3 as from a collecting surface 3 to a transit zone 4;4'. The device 1 thus allows a collecting surface 3 to be supplied and/or emptied via a transit zone 4;4' which may be an entry transit zone 4 or an exit transit zone 4'. This transit zone 4;4' is, in general, supplied or emptied continuously using a single-file entry or exit conveyor according to whether respectively it is an entry transit zone 4 or an exit transit zone 4'.

The upper surface of the transit zone 4;4', namely the surface supporting the products 2, extends in a conveying plane 15 which is theoretically horizontal. This transit zone 4;4' extends in a longitudinal direction 16 and transports products 2 which circulate in this direction 16.

The transit zone 4;4' comprises at least two longitudinal conveyors 5;5';6;6' which extend in the longitudinal direction 16, these conveyors 5;5';6;6' being driven independently. In other words, these conveyors 5;5';6;6' can operate simultaneously or otherwise and at the same or different speeds. Each of these conveyors 5;5';6;6' is intended to transport a single file of products 2, namely a succession of products 2 which extend in the longitudinal direction 16 and is just one single product 2 wide. These conveyors 5;5';6;6' are thus single-file conveyors.

A slider bed 7;7' lies between the at least two longitudinal conveyors 5;5';6;6'. This slider bed 7;7' extends in the longitudinal direction 16 and may generally accept at least one longitudinal row 9 of products 2.

As already described in applications FR1659569 and FR1556106, such an architecture advantageously notably makes it possible to maintain the throughput of the line.

In principle, the collecting surface 3 extends in a horizontal plane. In general, it extends in the same plane 15 as the upper surface of the transit zone 4;4'. The collecting surface 3 is able to store successive rows of products 2. These rows are transferred transversely, from or to the transit zone 4;4'. In other words, they are transferred in a transverse transfer direction 17, namely a direction that is inclined, notably near perpendicular or even perpendicular, to the longitudinal direction 16, and which extends in a horizontal plane. On the collecting surface 3, the products 2 move in the transfer direction 17.

As indicated previously, the transit zone 4;4' runs alongside the collecting surface 3, which means to say that it lies along one of the edges of this surface 3. As a preference, the transit zone 4;4' extends along the entire length of the collecting surface 3. The upper surface of the transit zone 4;4' and the collecting surface 3 preferably extend in the same conveying plane 15. In theory, the transit zone 4;4' and the collecting surface 3 are abutted against one another and flush with one another.

The collecting surface 3 may be embodied by a stationary plate, but is preferably borne by a transverse conveyor able to move the products 2 thereon in the transfer direction 17.

In general, the conveyors used in the present invention are chain conveyors, belt conveyors, moving band or moving-belt conveyors which circulate around at least two rollers situated at the upstream and downstream ends of the conveyors.

The transfer device 1 according to the invention comprises:
- said collecting surface 3,
- said transit zone 4;4', and
- a transfer tool 8 transferring between the collecting surface 3 and the transit zone 4;4', equipped with at least three longitudinal vertical walls 9, and intended to push, transversely, longitudinal rows 10 of products 2 which rows are each positioned between two walls. Such a transfer therefore takes place in a direction that is transverse to said longitudinal direction.

In general, the device 1 may comprise one or more collecting surface(s) 3, one or more transit zone(s) 4;4' and one or more transfer tool(s) 8. In theory, there are as many transfer tools 8 as there are transit zones 4;4'.

The collecting surface 3 is preferably rectangular in shape. In that case, the transverse transfer direction 17 is generally perpendicular to the longitudinal direction 16.

The transfer tool 8 is therefore intended both to push the products 2 from a transit zone 4;4' toward a collecting surface 3 and from a collecting surface 3 toward a transit zone 4;4'. This tool 8 may therefore be respectively a tool 8 for supplying or clearing a collecting surface 3. This tool 8 pushes the products 2, more specifically rows of products 2, in a transverse transfer direction 17.

When products 2 are transferred using the tool 8, they are preferably stopped in the longitudinal direction 16 so as to reduce their risk of falling.

Such a tool 8 comprises at least three longitudinal vertical walls 9. These walls therefore extend in the longitudinal direction 16 and are mutually parallel.

As a preference, they have a length substantially equal to the longitudinal dimension of the collecting surface 3, so as to transfer rows 10 of products 2 of a length substantially equal to the longitudinal dimension of the collecting surface 3.

Each row 9 of products 2 lies between two walls 9 of the tool 8 as it is being transferred.

The transfer tool 8 is generally mounted on a manipulator, notably robot controlled, so as to be able to make movements both in the transverse direction (in order to perform a pushing action) and the vertical direction (in order to position itself at the correct location before pushing products 2 and withdrawing once the transverse push has been made).

The transfer device 1 according to the invention is characterized in that at least one wall 9 of the transfer tool 8 is mounted with the ability to move translationally on said tool 8 in a transverse direction, for a movement of pushing said products 2.

As described in greater detail later, such a mobility of at least one wall 9 within the tool advantageously makes it possible at least to reduce the floor space of the transfer device 1. Specifically, not only can the tool 8 perform the entire transfer of the products 2 between a transit zone 4;4' and a collecting surface 3 on its own without impacting the throughput of the line, but also this transfer can be performed with this tool 9 barely, if at all, extending beyond the transit zone 4;4' in the transverse transfer direction 17. Therefore the tool 8 encroaches little if at all on the adjacent collecting surface 3.

The at least one wall 9 mounted with the ability to move can move in a transverse translational movement within the transfer tool 8, namely in a direction which comprises at least one component perpendicular to the longitudinal direction 16.

The at least one wall 9 mounted with the ability to move is thus configured to move toward or away from the other walls 9 of the tool 8 while at the same time remaining parallel to these other walls 9. During such a movement, a row 10 of products 2 is thus pushed transversely, notably without any movement of the tool 8 itself. In particular, this pushing movement can be performed by moving at least the wall 9 with respect to said tool 8 while the tool 8 is stopped. In other words, the travel of at least the wall 9 within and with respect to the structure of said tool 8 is long enough to come into contact with the products 2 present.

It is within the competence of a person skilled in the art to set in place an appropriate system able to generate this translational mobility of at least one wall 9 within the tool 8 itself.

By way of examples of such systems mention may for example be made of a rack-pinion, belt-pulley, trapezoidal screw, link-crank, pantograph system or else of walls 9 mounted on shuttles effecting a translational movement along at least one linear axis.

The number of longitudinal conveyors 5;5';6;6' and the width of the slider bed 7;7' can vary from one device 1 to another, and may notably be adjusted according to the configuration of the line. In particular, it is conceivable for the device 1 to supply several machines downstream or else for the device 1 to be supplied by several machines upstream. It is therefore possible to make provision for a transit zone 4;4' to comprise for example four longitudinal conveyors 5;5';6;6' in order to be able:

- to be fed continuously by two single-file entry conveyors 11 conveying the products 2 from two distinct upstream machines and each supplying two of the conveyors 5;6 of the transit zone 4 alternatively, or
- to deliver products 2 continuously on two single-file exit conveyors 12 carrying the products 2 to two distinct downstream machines, the two conveyors 12 each being supplied continuously by two conveyors 5';6' of the transit zone 4' operating alternately.

The transfer tool 8 is also dimensioned accordingly, particularly in terms of the number of walls 9 and the width of the tool.

Figure 10:
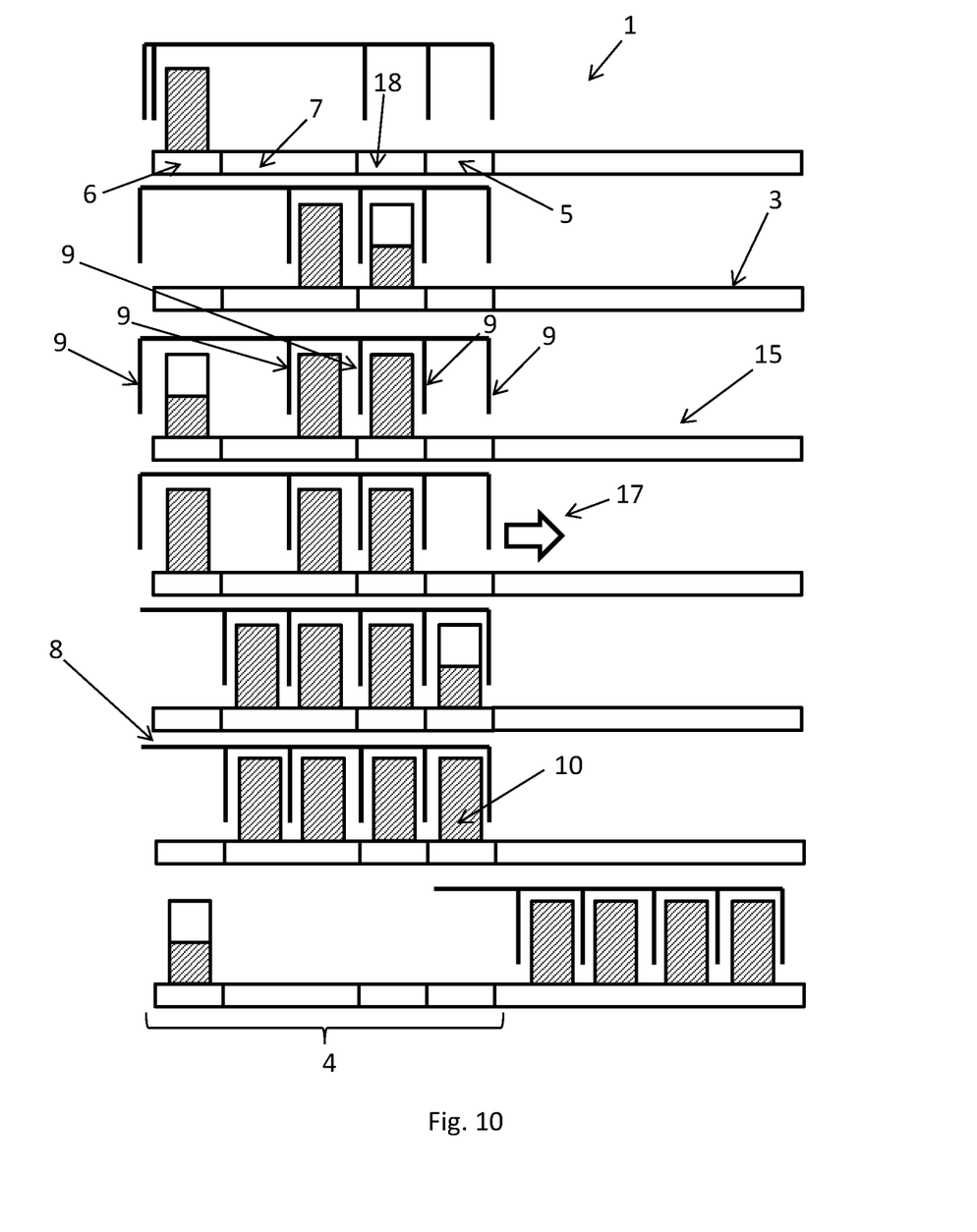
FIG. 10 is a schematic illustration of the transfer of products from a transit zone to a collecting surface, in accordance with embodiments of the present disclosure.

By way of example, FIG. 10 depicts a device 1 in which the transit zone 4;4' comprises three longitudinal conveyors 5;5';6;6' and a slider bed 7;7' able to receive two longitudinal rows 10 of products 2. Such a transit zone 4;4' may thus support five rows 10 of products 2. The other devices 1 depicted in the appended figures are themselves made up of two single-file longitudinal conveyors 5;5';6;6' spaced away from a slider bed 7;7' able to accept a single longitudinal row 10 of products 2.

Thus, according to one additional feature of the transfer device 1, the transit zone 4;4' is made up of two longitudinal conveyors 5;5';6;6' spaced away from a slider bed 7;7'.

In that case, the transit zone 4;4' may support three rows 10 of products 2, one row per conveyor 5;5';6;6' and one row on the slider bed 7;7'. As it is always necessary to be able to accept or clear products 2 on/from the transit zone 4;4' at the same time as transferring products 2 from or to the collecting surface 3 (for reasons of maintaining the throughput), two rows of products 2 are theoretically transferred simultaneously in this configuration. As a result, the tool 8 in this case comprises generally three or four vertical walls 9 according to the degree of stability of the products 2 transferred.

According to another additional feature of the transfer device 1, it comprises two distinct collecting surfaces 3 positioned on either side of the transit zone 4;4'.

In that case, the transit zone 4;4' runs alongside two collecting surfaces 3, one collecting surface 3 being on one side of the transit zone 4;4' and the other collecting surface 3 being on the other side of the transit zone 4;4' compared to the longitudinal circulation of products 2 on the transit zone 4;4'.

As a preference, the upper surface of the transit zone 4;4' and of the two collecting surfaces 3 extend in the same conveying plane 15 which is preferably horizontal. In theory, the transit zone 4;4' butts against and is flush with these two collecting surfaces 3.

According to this feature, one and the same transit zone 4;4' can then be used to supply two distinct collecting surfaces 3 with products 2 or to remove the products 2 that have accumulated on two distinct collecting surfaces 3. One and the same transfer tool 8 is preferably used to perform the transfer between the two collecting zones 3 and the transit zone 4;4'.

According to another additional feature of the transfer device 1, the transit zone 4;4' is an entry transit zone 4 via which the products 2 arrive on the collecting surface 3.

With this configuration, the transfer tool 8 allows the products 2 to be pushed from the entry transit zone 4 to the collecting surface 3.

Upstream of such an entry transit zone 4 there is generally a single-file entry conveyor 11 which feeds the entry transit zone 4 with products 2 from an upstream machine of the device 1. Such an entry conveyor 11 in theory supports a compact stream of products 2 with products 2 in contact with one another or spaced a small distance apart, evenly or otherwise.

In order to maintain the compactness of the stream, a diverter is arranged at the downstream end of this conveyor to direct the products 2 toward one or the other of the two longitudinal conveyors 5;6 of the entry transit zone 4 alternately. Thus, the entry transit zone is supplied continuously.

The use of a transfer tool 8 transferring from an entry transit zone 4 to a collecting surface 3 advantageously makes it possible to dispense with a push plate 13 (used in the known way to supplement a pushing tool with fixed walls of the double-cap type 14), which is notably vertical and longitudinal as depicted in the attached FIG. 1, for transferring the products 2 to the slider bed 7 from the entry transit zone 3. The use of such a plate 13 is known in plants equipped with an entry transit zone 3 running alongside a collecting surface 4 like those described earlier for feeding the second longitudinal entry conveyor 5;6 during transfer from the first conveyor 5;6 onto the slider bed 7. Such a plate 13 is generally placed on the outside of the device 1, along the entry transit zone 3.

As described in greater detail later, and depicted in the attached FIGS. 3 to 6 and 10, the relative mobility of at least one of the walls 9 of the tool 8 effectively allows the movement of pushing the products 2 from a longitudinal conveyor 5;6 that has stopped toward the slider plate to be performed while at the same time another longitudinal conveyor 5;6 is being fed with products 2.

This then results in a device that is less expensive and occupies less floor space.

According to another additional feature of the transfer device 1, the transit zone 4;4' is an exit transit zone 4' via which the products 2 leave the collecting surface 3.

With this configuration, the transfer tool 8 allows the products 2 to be pushed from the collecting surface 3 toward the exit transit zone 4'.

Downstream of such an exit transit zone 4', the longitudinal conveyors 5';6' generally converge into a single single-file exit conveyor 12 which removes the products 2 from the exit transit zone 4' to convey them to a machine downstream of the device 1. This exit conveyor 12 is in continuous operation so as to supply the downstream machine with a good throughput. The transit zone 4' theoretically removes products 2 continuously from one or the other of the two longitudinal conveyors 5';6' of the exit transit zone 4' alternately.

The use of a transfer tool 8 transferring from a collecting surface 3 to an exit transit zone 4' advantageously makes it possible to save on floor space. Effectively, the known pushing tool 14 comprising three fixed vertical longitudinal plates and depicted in FIG. 2 extends beyond the transit zone 4' at the end of the cycle.

As depicted in FIGS. 7 to 9, the relative mobility of at least one of the walls 9 of the tool 8 allows the tool 8 to remain over the device 1.

According to certain embodiments, the device 1 is equipped with an entry transit zone 4, with a collecting surface 3 and with an exit transit zone 4'. Such a device 1 can therefore be equipped with one or two transfer tools 8. As a preference, such a device 1 comprises two transfer tools 8, a first one dedicated to pushing the products 2 from the entry transit zone 4 to the collecting surface 3, and a second dedicated to pushing the products 2 from the collecting surface 3 to the exit transit zone 4'.

As indicated previously, and notably when the transit zone 4;4' is made up of two longitudinal conveyors 5;5';6;6' spaced away from a slider bed 7;7', the transfer tool 8 preferably comprises three or four longitudinal vertical walls 9.

Figure 6:
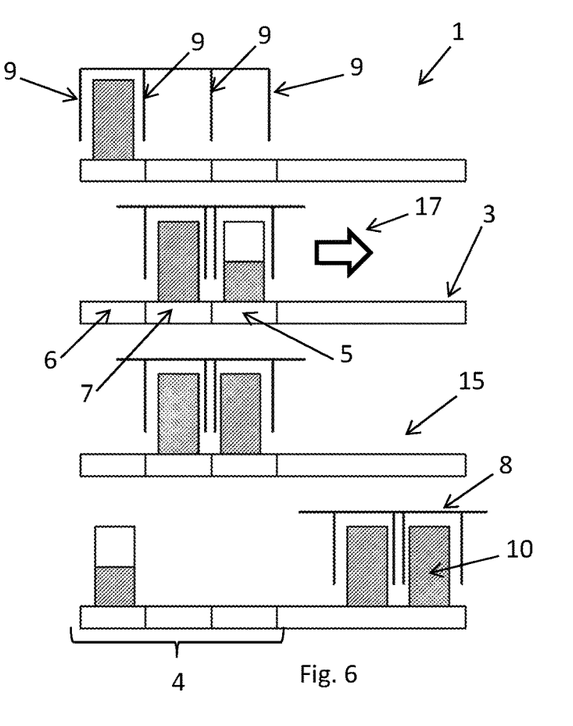
FIG. 6 is a schematic illustration of the transfer of products from a transit zone to a collecting surface, in accordance with embodiments of the present disclosure.

The use of a transfer tool 8 equipped with four walls 9 is of particular benefit when transferring somewhat unstable products 2 insofar as it is generally possible, with this configuration, to hold each row 10 of products 2 between two walls 9 that are relatively close to the products 2 being transferred throughout the transfer to or from the collecting surface 3, as illustrated notably in the attached FIGS. 6 and 9.

In general, when the tool 8 comprises four walls 9, the two walls 9 situated on the same side of the tool 8 are not able to move relative to one another. This is because the distance respectively separating the two left-hand walls 9 and the two right-hand walls 9 is generally tailored to the size of the products 2 that are to be transferred so as to limit any risk of them falling while they are being transferred.

As a preference, when the tool 8 comprises four vertical walls: either the two walls 9 situated on the same side of the tool 8 are mounted with the ability to move (namely the two left-hand walls 9 or the two right-hand walls 9) on the tool 8, or all four walls 9 are mounted with the ability to move on the tool 8.

According another additional feature of the transfer device 1, the transfer tool 8 comprises three longitudinal vertical walls 9.

Such embodiments are depicted in FIGS. 3 to 5, 7 and 8.

Such a tool 8 may thus comprise one, two or three vertical walls 9 able to move within the tool 8.

As a preference, just one or two of the three walls 9 are able to move translationally within the tool 8.

When the tool 8 is equipped with three walls 9, it comprises two lateral or outer walls 9 and one central wall 9.

Thus, according to another additional feature of the transfer device 1, of the three walls 9, only one of the lateral vertical walls 9 is mounted with the ability to move.

Figure 3:
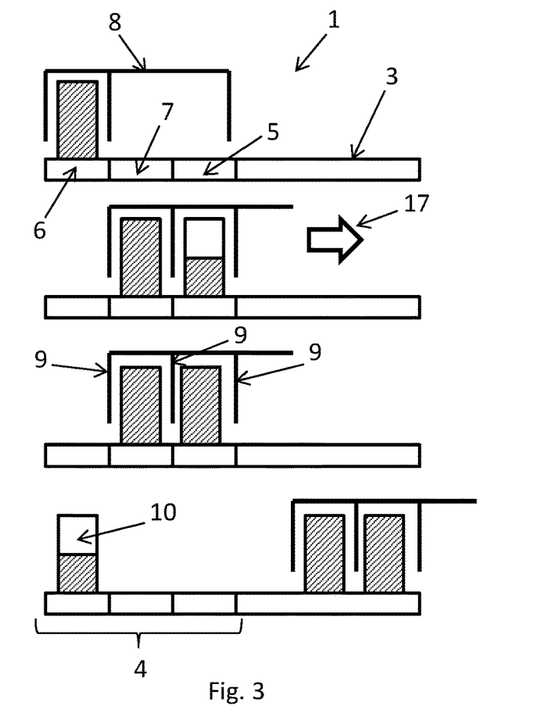
FIG. 3 is a schematic illustration of the transfer of products from a transit zone to a collecting surface, in accordance with embodiments of the present disclosure.
Figure 5:
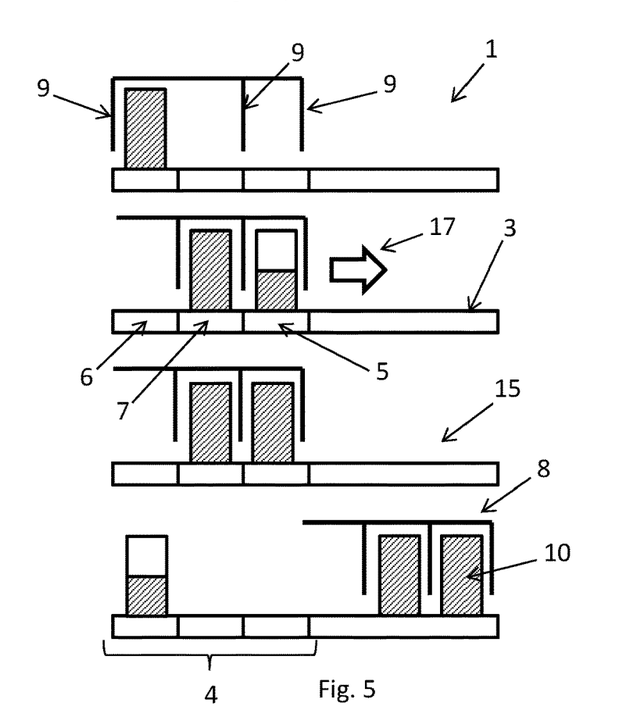
FIG. 5 is a schematic illustration of the transfer of products from a transit zone to a collecting surface, in accordance with embodiments of the present disclosure.

Such embodiments are depicted in the attached FIGS. 3, 5 and 7. The mobility of the lateral wall 9 may be generated using any system that makes it possible to generate translational mobility following the example of the examples given hereinabove.

Figure 4:
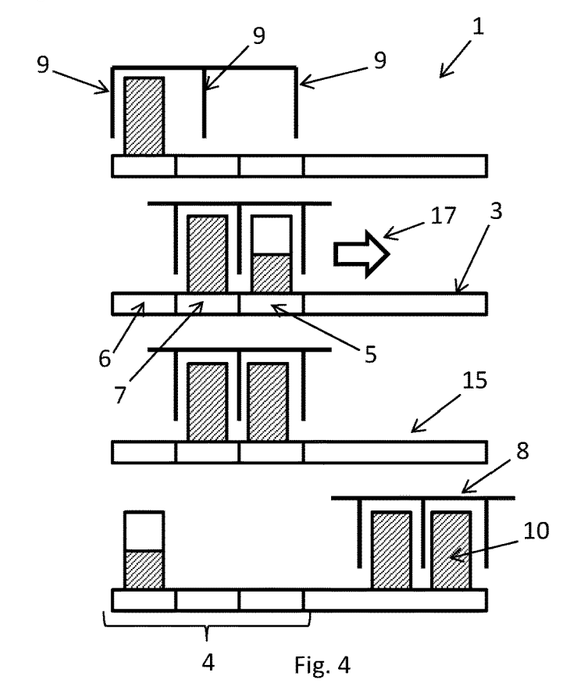
FIG. 4 is a schematic illustration of the transfer of products from a transit zone to a collecting surface, in accordance with embodiments of the present disclosure.

Alternatively, of the three walls 9, two of the lateral vertical walls 9 are mounted with the ability to move, as depicted in FIGS. 4 and 8. This may notably be a lateral wall 9 and the central wall 9 after the example of FIG. 8.

However, as a preference, when two of the three walls 9 are mounted with the ability to move on the tool 8, the mobile walls 9 are preferably the two lateral walls 9, as illustrated in FIG. 4. This is because such mobility within the tool 8 may advantageously be managed using a single actuator.

Thus, according to another additional feature of the transfer device 1, of the three walls 9, only the two lateral vertical walls 9 are mounted with the ability to move, an actuator common to said two walls 9 allowing the distance between said lateral walls 9 and the central wall 9 to be modified symmetrically.

With such a configuration, the two lanes formed by the free space between a lateral wall 9 and the central wall 9 are identical in width whatever the movements of the lateral walls 9. In other words, the separation between the central wall 9 and one lateral wall 9 is identical to the separation between the central wall 9 and the other lateral wall 9. Such a system proves to be particularly advantageous insofar as in addition to requiring just one actuator, making it therefore particularly economical, it is compatible with several formats of products 2. Specifically, because the two lanes systematically have the same width, and because this width is adjustable, it can be adapted to suit the dimensions of the products 2 being processed. Of course, and as detailed later on in the description of the attached FIG. 4, this width is also modified in order to contribute to the transfer of the products 2 between the transit zone 4;4' and the collecting surface 3.

As a preference, this type of configuration is achieved using a device of the pantograph type after the example of that depicted in FIG. 12 which will be detailed later on. Of course, any other system that allows the width of the two lanes to be modified in the same way using a single actuator by moving only the two lateral walls 9 is equally suitable.

Another subject of the invention is a method implementing the device as described above, namely a method for supplying products 2 to a collecting surface 3 installed between two workstations of an industrial processing line for the in-line processing of products 2, from an entry transit zone 4 supplied with products 2 continuously by an entry conveyor 11, said transit zone 4 comprising at least one inner longitudinal conveyor 5 and one outer longitudinal conveyor 6 which are spaced away from a slider bed 7 and each intended to transport a file of products 2, the transit zone 4 running alongside the collecting surface 3 in the region of the inner longitudinal conveyor 5, comprising at least the cyclic repetition of the following succession of steps:

a) feeding the outer conveyor 6 with products, b) stopping the products on the outer conveyor 6, halting the feeding of the outer conveyor 6 with products 2 and feeding the inner conveyor 5 with products 2, c) transversely pushing the products 2 from the outer conveyor 6 onto the slider bed 7, d) stopping the products on the inner conveyor 5, halting the feeding of the inner conveyor 5 with products 2 and feeding the outer conveyor 6 with products 2, and e) transversely pushing the products 2 from the inner conveyor 5 and from the slider bed 7 onto the collecting surface 3.

This method is characterized in that steps c) and e) are formed using the one same transfer tool 8 comprising at least three longitudinal vertical walls 9, and in that step c) is performed at least using a movement of at least one wall 9 of the transfer tool 8 within said tool 8. Therefore it is the movement of at least one wall 9 inside and with respect to the tool 8, preferably fixed at this moment, that allows the movement of pushing the products 2 to be performed during at least part of the transfer thereof.

Exemplary embodiments of such supply methods are notably illustrated in the attached FIGS. 3 to 6 and 10.

The entry conveyor 11 is therefore positioned upstream of the transit zone 4. It carries the products 2 coming from an upstream machine, in the form of a single-file stream, toward the entry transit zone 4. A diverter is theoretically located at the downstream end of this entry conveyor so that it continuously feeds the transit zone 4 with products 2.

In practice, the entry conveyor 11 feeds each longitudinal conveyor of the transit zone 4 alternately. When the transit zone 4 is comprises exactly two longitudinal conveyors, the entry conveyor 11 feeds the inner conveyor 5 and the outer conveyor 6 of the transit zone 4 alternately.

In general, before transferring products 2 from the transit zone 4 onto the collecting surface 3, the transfer tool 8 comes in from above via a movement of a manipulator on which said tool 8 is mounted. The tool 8 is then lowered so that it can act on the products 2 by pushing transversely with at least one wall 9 positioned at each end of the transit zone 4 in the transfer direction. It is then in its initial position.

The explanatory paragraphs below seek to provide greater detail regarding the supply method more specifically with respect to a method designed for a transit zone 4 equipped with only one conveyor 5 and one conveyor 6. Nevertheless, the principle is still similar for a device comprising more conveyors 5;6.

Once the longitudinal conveyor 6 has been fed with products 2 and stopped, the row of products 2 thereon is pushed using the tool 8 as far as the slider bed 7, while the inner conveyor 5 is still being fed.

This pushing movement is performed at least by moving at least one wall 9 within the tool 8 so as to allow the conveyor 5 to be fed during the pushing. Depending on the arrangement and number of walls 9 that are able to move within the tool 8, this pushing movement is performed solely by moving one or several walls 9 within the tool 8 or by a combined movement with the tool 8 itself Once the longitudinal conveyor 5 has been fed with products 2 and stopped, the row 10 of products 2 thereon, together with the row 10 of products 2 on the slider bed 7, are pushed simultaneously using the tool 8 as far as the collecting surface 3 while the outer conveyor 6 is being fed.

During this second pushing action, the two rows 10 of products 2 are moved simultaneously using a transverse sweep of the manipulator of the tool 8, each row 10 being firmly clamped between two walls 9 of the tool.

The tool 8 is then placed once again in its initial position so that it is ready to act when the conveyor 6 is stopped again, once the feeding thereof is complete. This return to the initial position is performed using the manipulator, by lifting, moving across to the transit zone 4 then lowering. During this time, the mobile wall(s) 9 are also positioned correctly so that they can at least contribute to the pushing of the products 2 onto the slider bed 7.

As indicated previously, step c) of pushing the products 2 onto the bed 7 is generated using a transverse movement of at least one wall 9 within the tool 8 alone, or in combination with a movement of the tool 8 itself Thus, according to one possible additional feature of the supply method, step c) is performed using a combined movement of at least one wall 9 of the transfer tool 8 and of the transfer tool 8 itself Such embodiments are notably illustrated in FIGS. 4 and 6.

According to another possible additional feature of the supply method, step c) is performed at least using a simultaneous movement of two walls 9 of the transfer tool 8 within said tool 8.

Such embodiments are notably illustrated in FIG. 4.

A further subject of the invention is another method employing the device as described hereinabove, namely a method for removing products 2 arranged in longitudinal rows 10 side by side on a collecting surface 3 installed between two workstations of an industrial processing line for in-line processing of products 2, to an exit transit zone 4' so as to remove products 2 continuously onto an exit conveyor 12, said transit zone 4' comprising at least one inner longitudinal conveyor 5' and an outer longitudinal conveyor 6' which are spaced away from a slider bed 7' and each intended to transport one file of products 2, the transit zone 4' running alongside the collecting surface 3 in the region of the inner longitudinal conveyor 5', comprising at least the cyclic repetition of the following succession of steps:

a) pushing the rows 10 of products 2 transversely from the collecting surface 3 onto the inner conveyor 5' and the slider bed 7';

b) actuating the inner conveyor 5' to release the products 2 thereon onto the exit conveyor 12;

c) pushing the products 2 transversely from the slider bed 7' onto the outer conveyor 6';

d) actuating the outer conveyor 6' to release the products 2 onto the exit conveyor 12 and stopping the inner conveyor 5';

steps a) and c) being performed using the one same transfer tool 8 comprising at least three longitudinal vertical walls 9;

This method is characterized in that step c) is performed at least using a movement of at least one wall 9 of the transfer tool 8 within said tool 8.

Exemplary embodiments of such clearing methods are notably illustrated in the attached FIGS. 7 to 9.

The exit conveyor 12 is therefore positioned downstream of the transit zone 4'. The conveyors 5';6' of the transit zone 4' converge so that each in turn can supply the conveyor 12. This conveyor 12 therefore receives products 2 coming from the transit zone 4' in order to convey them to a machine downstream of the device 1.

In general, before products 2 are transferred from the collecting surface to the transit zone 4', the transfer tool 8 comes in from above via a movement of a manipulator on which it is mounted. The tool 8 is then lowered so that it can act on the products 2 by pushing transversely. In this initial position, the walls are positioned in such a way as to be positioned as close as possible to the rows that are to be moved, as depicted in FIGS. 7 to 9.

The explanatory paragraphs below seek to provide greater detail regarding the clearing method relating more specifically to a method suited to a transit zone 4' equipped with just one conveyor 5' and one conveyor 6'. Nevertheless, the principle remains similar with a device comprising more conveyors 5';6'.

Two longitudinal rows 10 of products 2 positioned side by side on the collecting surface 3 are pushed transversely respectively onto the conveyor 5' which is stopped and onto the bed 7' by a sweep of the tool 8 generated by the manipulator that supports it. During this time, the conveyor 6' may be in operation in order to release the products 2 onto the conveyor 12.

The conveyor 12 is therefore supplied with products 2 by the inner conveyor 5' while the outer conveyor 6' is stopped. The row 10 of products 2 on the slider bed is then pushed using the tool 8 onto the conveyor 6'.

This pushing movement is performed at least by movement of at least one wall 9 within the tool 8 so that the tool 8 does not extend beyond the transit zone 4' in the transfer direction 17. Depending on the arrangement and number of walls 9 that can move within the tool 8, this pushing movement may be performed only by the movement of one or more walls 9 within the tool 8 or else by a combined movement with the tool 8 itself.

When the conveyor 5' is emptied of its products 2, the conveyor 12 is once again supplied with products 2, via the inner conveyor 6'.

During this time, the tool 8 is once again placed in its initial position so as to push two new rows 10 of products 2 from the collecting surface 3 onto the conveyor 5' and the bed 7' respectively while the conveyor 6' is emptying itself of its products 2. This return to the initial position is performed by the manipulator, by rising, moving to the collecting surface 3 then lowering once it has positioned itself over two rows 10. During this time, the wall(s) 9 able to move are also placed in their initial position.

In the embodiments of the present invention which are illustrated in the attached FIGS. 3 to 11, the devices 1 depicted comprise a transit zone 4;4' butting against and flush with a collecting surface 3. The upper surface of the transit zone 4;4' which supports the products 2, and the collecting surface 3 are comprised in the one same conveying plane 15, which is horizontal.

In FIGS. 3 to 9 and 11, the transit zones 4;4' are formed of two single-file longitudinal conveyors 5;5';6;6' spaced away from a slider bed 7;7' able to accept a row 9 of products 2. The transit zones 4;4' depicted in these figures are therefore able to support three rows 9 of products 2 simultaneously. These transit zones 4;4' each comprise an inner longitudinal conveyor 5;5' which is in contact with the collecting surface 3 and an outer longitudinal conveyor 6;6' which is at one transverse end of the device 1.

The devices 1 depicted in FIGS. 3 to 6 comprise an entry transit zone 4, namely a zone in which the products 2 circulate so that they can be transferred onto the collecting surface 3. By contrast, the devices 1 depicted in FIGS. 7 to 9 comprise an exit transit zone 4', namely a zone in which the products 2 are transferred from the collecting surface 3.

The device 1 depicted in FIG. 11 for its part comprises an entry transit zone 4 and an exit transit zone 4' which are spaced apart by a collecting surface 3. The device 1 depicted in this figure is in the process of being emptied, the exit outer longitudinal conveyor 6' is in the process of emptying products 2 onto the exit conveyor 12, while the tool 8 (which for the sake of clarity has not been depicted) is making ready to transfer two rows 10 of products 2 which are on the collecting surface 3 toward the exit inner conveyor 5' and the slider bed 7'.

The device 1 depicted in FIG. 10 is a device 1 for transferring products 2 from an entry transit zone 4 to a collecting surface 3. It therefore notably comprises an entry transit zone 4. This transit zone 4 comprises three single-file longitudinal conveyors 5;6;18 and a slider bed 7 able to accept two longitudinal rows 9 of products 2 side by side. Of the longitudinal conveyors 5;6;18, the inner longitudinal conveyor 5 is in contact with the collecting surface 3, the outer longitudinal conveyor 6 is at a transverse end of the device 1 and the longitudinal conveyor 18 is situated between the inner longitudinal conveyor 5 and the slider bed 7.

Several examples of transfer tools 8 suitable for the present invention are depicted in the attached FIGS. 3 to 12.

More specifically, the tools 8 depicted in FIGS. 3, 5, 7 and 13 comprise a single wall 9 able to move in a transverse translational movement with respect to the tool 8, namely a lateral wall 9.

FIG. 13 shows various configurations of possible mobility of a lateral wall 9 within a tool 8 that has three walls 9. FIG. 13 a) illustrates in general terms a mobility of one of the lateral walls 9, namely the top wall in the diagram, in a direction orthogonal to the direction in which the walls 9 extend. Such mobility is generated by means of two transverse elements which are perpendicular to the walls 9 and which may for example be belts, guideways or else a pantograph.

This FIG. 13 also shows in detail one nonlimiting example of a possible system making it possible to generate such a movement of a lateral wall 9 (FIG. 13 b) and c)). It is a pantograph system in which two bars are fixed parallel to one another, each bar being pivot-connected to a point (A or B) on the fixed central wall 9, and to a point on the mobile lateral wall 9. Each of these bars is mounted with the ability to rotate about the two vertical axes on which the respective points of connection between the bar and the mobile lateral wall 9 and between the bar and the central fixed wall 9 are located. A rotational movement about the vertical axis to which the point A or B belongs therefore leads to a transverse translational movement of the mobile lateral wall 9. In particular, FIG. 13 shows a tool 8 before (a)) and after (b)) movement of the mobile lateral wall 9 within the tool 8.

By contrast, the tools 8 depicted in FIGS. 4, 8 and 12 comprise two walls 9 that are able to move in a transverse translational movement with respect to the tool 8. More specifically, FIG. 8 illustrates a tool in which the central wall 9 and one lateral wall 9 are able to move within the tool 8. FIG. 4 illustrates an embodiment in which the two lateral walls 9 are able to move symmetrically with respect to the longitudinal central wall 9, in a direction perpendicular to the longitudinal direction 16.

Finally, FIG. 12 shows various configurations of possible mobility of the two lateral walls 9 within a tool 8 having three walls 9. FIG. 12 a) illustrates in general terms a mobility of the lateral walls 9, in a direction orthogonal to the direction in which the walls 9 extend. Such mobility is generated by means of two transverse elements perpendicular to the walls 9 and which may for example be belts, guideways or else a pantograph.

This FIG. 12 also shows in greater detail one nonlimiting example of a possible system that makes it possible to generate a concerted and symmetrical movement of the two lateral walls 9 as illustrated in FIG. 4 (FIG. 12 b) and c)). This is a pantograph-type system making it possible, using an actuator that is common to the two lateral walls 9, to generate movements of the two lateral walls 9. In order to do this, two bars are arranged parallel to one another, the center of each bar being pivot-connected to a point (A or B) on the fixed central wall 9, and the ends of each bar are pivot-connected respectively to a point on the first mobile lateral wall 9 and to a point on the second mobile lateral wall 9. Each of these bars is mounted with the ability to rotate about the three vertical axes on which the respective points of connection between the bar and the two mobile lateral walls 9 and between the bar and the fixed central wall 9 are situated. A rotational movement about the vertical axis to which the point A or B belongs therefore leads to a transverse translational movement of the two mobile lateral walls 9, in which movement the distance between the central wall 9 and one lateral wall 9 is at every moment equal to the distance between the central wall 9 and the other lateral wall 9. In particular, FIG. 12 shows a tool 8 before (a)) and after (b)) the movement of the mobile lateral walls 9 within tool 8.

FIGS. 6 and 9 depict tools 8 comprising exactly four vertical walls 9 which are particularly used in devices 1 equipped with three-lane transit zones 4;4', when the products 2 transferred are unstable.

In these two figures, the four walls 9 are all able to move symmetrically with respect to the center of the tool 8. A system of the pantograph type may for example be used to generate this type of mobility.

However, tools with four walls 9 of which only the two walls positioned on one or other side of the tool are also able to move are also conceivable.

FIG. 10 depicts an example of a tool 8 comprising five vertical longitudinal walls 9. This type of tool can be employed in configurations in which the transit zone 4;4' comprises more than three circulating lanes, for example five circulating lanes, as in FIG. 10. By way of example, the tool 8 of FIG. 10 comprises two walls 9 mounted with the ability to move, namely two walls positioned on one side of the central wall 9, but other tools 8 may be employed, for transferring the products 2 between a five-lane transit zone 4;4' and a collecting surface 3.

FIGS. 3 to 10 depict the transfer of products 2 between the collecting surface 3 and the transit zone 4;4'. More specifically, FIGS. 3 to 6 and 10 depict possible embodiments of the transfer of products 2 during a method of supplying a collecting surface 3 with products 2 from an entry transit zone 4.

In FIGS. 3, 5 and 10, the step(s) c) of pushing the products 2 from the outer conveyor 6 onto the slider bed 7 is performed solely by means of a movement of at least one wall 9 within the tool 8. By contrast, in FIGS. 4 and 6, this (these) steps c) are performed also with a sweeping movement of the tool 8 in the transfer direction 17, which is preferably perpendicular to the longitudinal direction 16.

As for FIGS. 7 to 9, these depict possible embodiments of transfers of products 2 during a method of removing products 2 from a collecting surface 3 to an exit transit zone 4'.

In FIG. 8, the step(s) c) of pushing the products 2 from the slider bed 7 onto the outer conveyor 6' is performed solely by means of a movement of at least one wall 9 within the tool 8. By contrast, in FIGS. 7 and 9, the step c) is performed also with a sweeping movement of the tool 8 in the transfer direction 17, which is preferably perpendicular to the longitudinal direction 16.

By virtue of the invention it is thus possible to achieve transfer between a longitudinal transit zone 4;4' and a transverse collecting surface 3 that runs alongside this transit zone 4;4' using a single transfer tool 8 which protrudes little, if at all, beyond the transit zone 4;4' (on its opposite side to the collecting surface 3) while at the same time allowing continuous feeding or removal of products to or from the transit zone 4.

The present invention also makes it possible easily to achieve transfer between a longitudinal transit zone 4;4' and two collecting surfaces 3 placed on either side of said transit zone 4;4'. Specifically, when products 2 are being transferred, the tool 8 advantageously does not extend beyond the transit zone 4;4' in the transfer direction 17, thus simplifying the transfers between a transit zone 4;4' and two collecting surfaces 3.

The invention claimed is:

1. A transfer device (1) for transferring products (2) in an industrial processing line for the in-line processing of products (2), between a collecting surface (3) and a transit zone (4;4') running alongside the collecting surface (3), said transit zone (4;4') comprising at least two longitudinal conveyors (5;5';6;6') spaced away from a slider bed (7;7') and each intended to transport a file of products (2), said device (1) comprising:
said collecting surface (3),
said transit zone (4;4'), and
a transfer tool (8) transferring between the collecting surface (3) and the transit zone (4;4'), wherein the transfer tool (8) is mounted on a robot-controlled manipulator such that the transfer tool (8) is moveable in both a transverse and a vertical direction,
and wherein the transfer tool (8) is equipped with at least three longitudinal vertical walls (9), and intended to push, transversely, longitudinal rows (10) of products (2) which rows are each positioned between two walls (9),
wherein at least one wall (9) of the transfer tool (8) is mounted with the ability to move translationally on said tool (8) in a transverse direction inside of and with respect to the transfer tool (8), for a movement of pushing said products (2), wherein the at least one wall (9) performs at least part of the transfer of the products.

2. The transfer device (1) as claimed in claim 1, wherein the transit zone (4;4') is made up of two longitudinal conveyors (5;5';6;6') spaced away from a slider bed (7;7').

3. The transfer device (1) as claimed in claim 1, wherein it comprises two distinct collecting surfaces (3) positioned on either side of the transit zone (4;4').

4. The transfer device (1) as claimed in claim 1, wherein the transit zone (4;4') is an entry transit zone (4) via which the products (2) arrive on the collecting surface (3).

5. The transfer device (1) as claimed in claim 1, wherein the transit zone (4;4') is an exit transit zone (4') via which the products (2) leave the collecting surface (3).

6. The transfer device (1) as claimed in claim 1, wherein the transfer tool (8) comprises three longitudinal vertical walls (9).

7. The transfer device (1) as claimed in claim 6, wherein, of the three walls (9), only one of the lateral vertical walls (9) is mounted with the ability to move.

8. The transfer device as claimed in claim 6, wherein, of the three walls (9), only the two lateral vertical walls (9) are mounted with the ability to move, an actuator common to said two walls (9) allowing the distance between said lateral walls (9) and the central wall (9) to be modified symmetrically.

9. A method for supplying products (2) to a collecting surface (3) installed between two workstations of an industrial processing line for the in-line processing of products (2), from an entry transit zone (4) supplied with products (2) continuously by an entry conveyor (11), said transit zone (4) comprising at least one inner longitudinal conveyor (5) and one outer longitudinal conveyor (6) which are spaced away from a slider bed (7) and each intended to transport a file of products (2), the transit zone (4) running alongside the collecting surface (3) in the region of the inner longitudinal conveyor (5), comprising at least the cyclic repetition of the following succession of steps:
a) feeding the outer conveyor (6) with products,
b) stopping the products on the outer conveyor (6), halting the feeding of the outer conveyor (6) with products (2) and feeding the inner conveyor (5) with products (2),
c) transversely pushing the products (2) from the outer conveyor (6) onto the slider bed (7),
d) stopping the products on the inner conveyor (5), halting the feeding of the inner conveyor (5) with products (2) and feeding the outer conveyor (6) with products (2), and
e) transversely pushing the products (2) from the inner conveyor (5) and from the slider bed (7) onto the collecting surface (3);
wherein steps c) and e) are formed using the one same transfer tool (8) comprising at least three longitudinal vertical walls (9), and in that step c) is performed using a movement of at least one wall (9) of the transfer tool (8) within said tool (8).

10. The supply method as claimed in claim 9, wherein step c) is performed using a combined movement of at least one wall (9) of the transfer tool (8) and of the transfer tool (8) itself.

11. The supply method as claimed in claim 9, wherein step c) is performed at least using a simultaneous movement of two walls (9) of the transfer tool (8) within said tool (8).

12. A method for removing products (2) arranged in longitudinal rows (10) side by side on a collecting surface (3) installed between two workstations of an industrial processing line for in-line processing of products (2), to an exit transit zone (4') so as to remove products (2) continuously onto an exit conveyor (12), said transit zone (4') comprising at least one inner longitudinal conveyor (5') and an outer longitudinal conveyor (6') which are spaced away from a slider bed (7') and each intended to transport one file of products (2), the transit zone (4') running alongside the collecting surface (3) in the region of the inner longitudinal conveyor (5'), comprising at least the cyclic repetition of the following succession of steps:
a) pushing the rows (10) of products (2) transversely from the collecting surface (3) onto the inner conveyor (5') and the slider bed (7');
b) actuating the inner conveyor (5') to release the products (2) thereon onto the exit conveyor (12);
c) pushing the products (2) transversely from the slider bed (7') onto the outer conveyor (6');
d) actuating the outer conveyor (6') to release the products (2) onto the exit conveyor (12) and stopping the inner conveyor (5');
steps a) and c) being formed using the one same transfer tool (8) comprising at least three longitudinal vertical walls (9);
wherein step c) is performed at least using a movement of at least one wall (9) of the transfer tool (8) within said tool (8), inside and with respect to the tool (8) such that the at least one wall (9) at least partially performs the transfer of the products.

13. The transfer device (1) as claimed in claim 2, wherein it comprises two distinct collecting surfaces (3) positioned on either side of the transit zone (4;4').

14. The transfer device (1) as claimed in claim 2, wherein the transit zone (4;4') is an entry transit zone (4) via which the products (2) arrive on the collecting surface (3).

15. The transfer device (1) as claimed in claim 2, wherein the transit zone (4;4') is an exit transit zone (4') via which the products (2) leave the collecting surface (3).

16. The transfer device (1) as claimed in claim 2, wherein the transfer tool (8) comprises three longitudinal vertical walls (9).

17. The supply method as claimed in claim 10, wherein step c) is performed at least using a simultaneous movement of two walls (9) of the transfer tool (8) within said tool (8).

\* \* \* \* \*